United States Patent
Vélez Justiniano

(10) Patent No.: US 10,928,705 B2
(45) Date of Patent: Feb. 23, 2021

(54) MOBILE DEVICE CASE HAVING A PLURALITY OF LENS COVERS BIASED IN A LENS COVERING POSITION

(71) Applicant: Eric Vélez Justiniano, Northbrook, IL (US)

(72) Inventor: Eric Vélez Justiniano, Northbrook, IL (US)

( * ) Notice: Subject to any disclaimer, the term of this patent is extended or adjusted under 35 U.S.C. 154(b) by 0 days.

(21) Appl. No.: 16/840,425

(22) Filed: Apr. 5, 2020

(65) Prior Publication Data

US 2020/0319530 A1    Oct. 8, 2020

Related U.S. Application Data

(60) Provisional application No. 62/830,486, filed on Apr. 7, 2019.

(51) Int. Cl.
| | | |
|---|---|---|
| *H04B 1/38* | (2015.01) | |
| *G03B 11/04* | (2021.01) | |
| *A45C 11/00* | (2006.01) | |

(52) U.S. Cl.
CPC ............ *G03B 11/043* (2013.01); *A45C 11/00* (2013.01); *A45C 2011/002* (2013.01)

(58) Field of Classification Search
CPC ...... H04B 1/38; H04B 1/3888; H04B 1/3827; H04M 1/02
See application file for complete search history.

(56) References Cited

U.S. PATENT DOCUMENTS

| | | | |
|---|---|---|---|
| 8,295,897 B2 * | 10/2012 | Griffin | H04M 1/0235 455/550.1 |
| 8,496,390 B2 | 7/2013 | Ohuchi et al. | |
| 9,411,379 B2 * | 8/2016 | Rinner | G06F 1/1656 |
| 9,813,100 B1 * | 11/2017 | Adams | H04B 1/3888 |
| 10,355,735 B2 * | 7/2019 | Ranjeva | G03B 11/043 |
| 2011/0058255 A1 | 3/2011 | Weiss | |
| 2014/0119718 A1 * | 5/2014 | Oh | G03B 11/041 396/448 |
| 2015/0163385 A1 * | 6/2015 | Haddad | G03B 17/565 348/374 |
| 2015/0229746 A1 * | 8/2015 | Bergin | H04B 1/3888 455/556.1 |
| 2015/0311941 A1 * | 10/2015 | Sorrentino | H04B 1/3888 455/575.8 |

* cited by examiner

*Primary Examiner* — Blane J Jackson
(74) *Attorney, Agent, or Firm* — James Conte; Conte Law Group

(57) ABSTRACT

A mobile device case has a first lens cover and a second lens cover. The first lens cover and second lens cover are each moveable between a first position and a second position. A coupling connects the first lens cover to the second lens cover. When the first lens cover is in the first position and the second lens cover is in the first position, movement of the first lens cover from the first position to the second position, simultaneously and automatically moves the second lens cover from the first position to the second position. When the first lens cover is in the second position and unlocked, and the second lens cover is in the second position, a biasing force automatically moves the first lens cover into the first position from the second position, and the second lens cover, by way of the coupling, automatically and simultaneously moves into the first position. The first lens cover automatically locks in place by a locking construction when the first lens cover is moved into the second position from the first position.

18 Claims, 10 Drawing Sheets

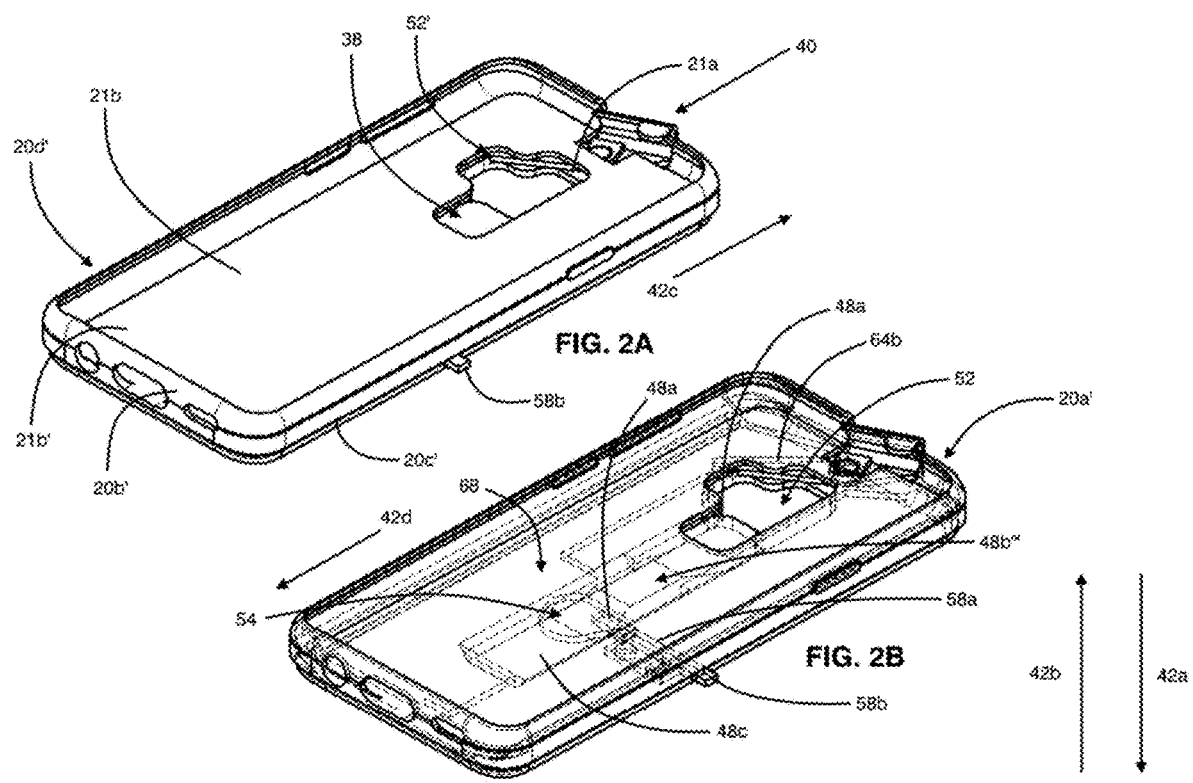

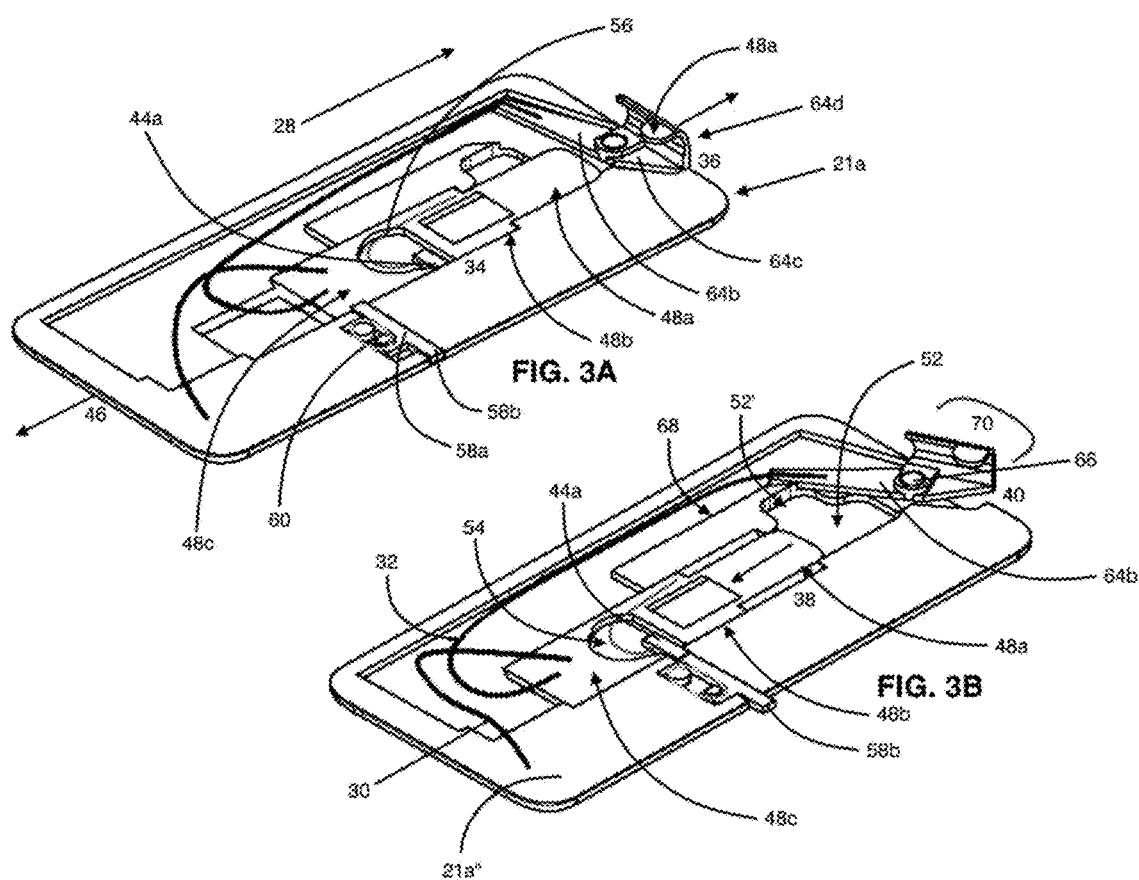

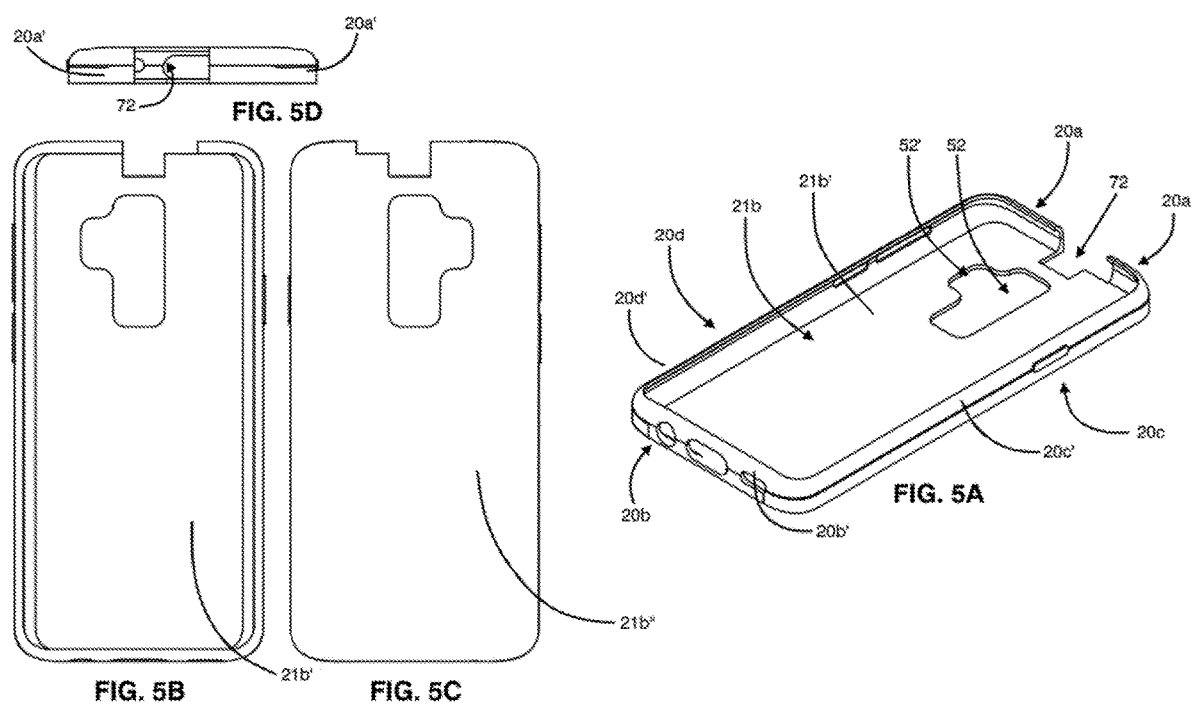

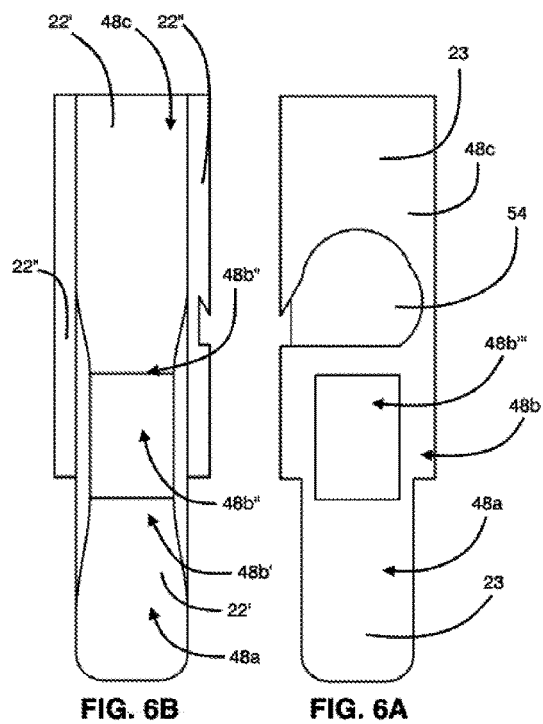
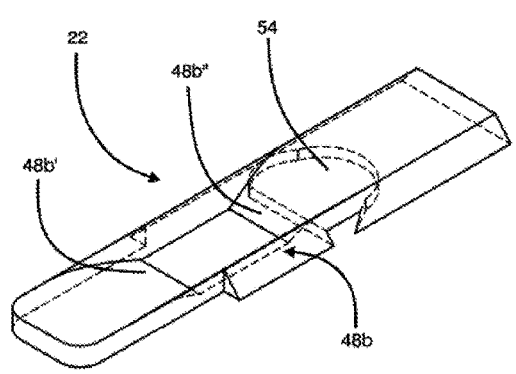
FIG. 6C
FIG. 6B  FIG. 6A

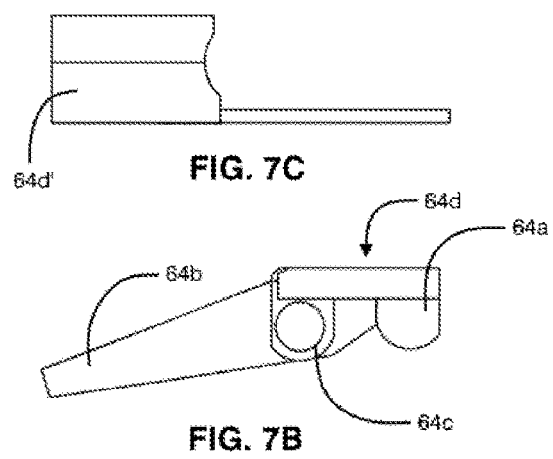
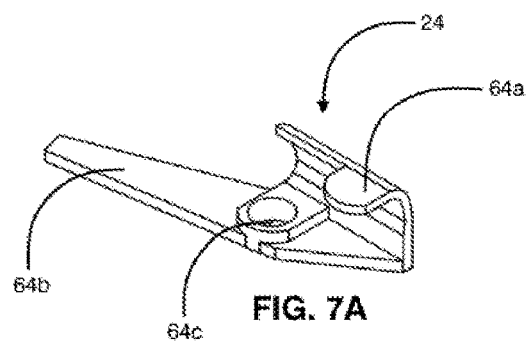

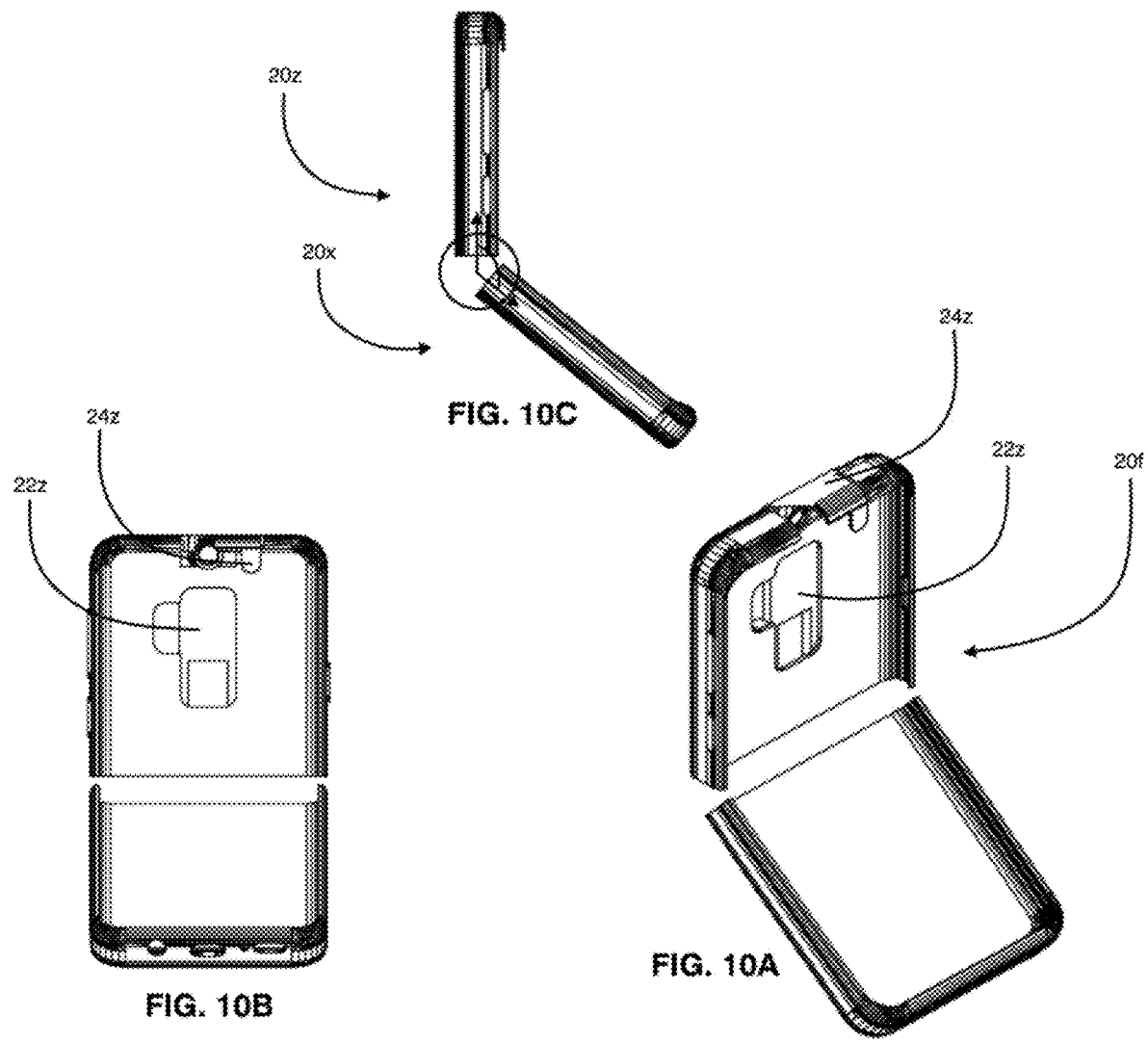

MOBILE DEVICE CASE HAVING A PLURALITY OF LENS COVERS BIASED IN A LENS COVERING POSITION

FIELD

The present disclosure concerns a mobile device case having a first lens cover coupled to a second lens cover. A resilient flexible member biases the first lens cover to reside in a lens covering first position. The coupling orients the second lens cover to reside in a lens covering first position when the first lens cover is in the first position. Movement of the first lens cover to an uncovering lens second position from the first position simultaneously and automatically moves the second lens cover from the first position to a lens uncovering position second position.

BACKGROUND

Mobile device cases having a lens cover are known. Also, mobile devices having a lens cover built into the frame of a mobile device or attached to the frame of a mobile device are known. US patent publication 20110058255, David G. Weiss, concerns a lens cover which covers a camera lens or a projection lens formed in the frame of a computer display or in the body of a personal digital assistant or mobile telephone. The cover is movable to allow the lens to operate and yet allow the cover to remain with the device. One cover can pivot around a pivot point to cover or uncover the lens. Another cover hinges in order to cover or uncover the lens. Another cover slides back and forth. Another cover hangs upon a hook located above the lens. Another cover is a suction cup applied over the lens. Another cover slides back and forth hanging on the top edge of the computer display. The cover may be fixed in place using gravity, friction, a snap, hook and loop closures, suction, or a ZIPLOC-type mechanism. The cover or its attaching means may be fixed to the computer or telephone using a self-adhesive.

U.S. Pat. No. 8,496,390, Maki Ohuchi, concerns a cover unit which includes a first cover that is movable between a cover position and an exposed position. A second cover is slidably movable in a direction perpendicular to its visible surface. A cover moving mechanism moves the second cover, wherein, when the first cover is at the cover position, the second cover is at such a height that the visible surface of the second cover is substantially coplanar with a visible surface of the first cover. When the first cover is moved from the cover position to the exposed position, the second cover is moved to such a height such that the visible surface of the second cover is moved by at least an amount that corresponds with the thickness of the first cover. When the first cover is at the exposed position, the first cover is above the visible surface of the second cover.

US patent publication 20150311941, Michael Sorrentino, concerns a protective case for a mobile device that has a body removably disposed on the mobile device and a movable lens cover disposed on the body proximate to the first camera lens. The movable lens cover includes a first lens occlusion section and a first sensor access section. The movable lens cover can have at least two positions in relation to the mobile device. A fully exposed position exposes both the first camera lens and the at least one sensor of the mobile device, and a first partially occluded position disposes the first lens occlusion section over the first camera lens preventing light from reaching the first camera lens and disposes the first sensor access section over the at least one sensor allowing the at least one sensor to receive the input

SUMMARY

In an embodiment of the invention, a mobile device case has a first lens cover and a second lens cover. The first lens cover and second lens cover are each moveable between a first position and a second position. When the first lens cover is in the first position and the second lens cover is in the first position, movement of the first lens cover from the first position to the second position, simultaneously and automatically moves the second lens cover from the first position to the second position. When the first lens cover is in the second position and unlocked, and the second lens cover is in the second position, a biasing force automatically moves the first lens cover into the first position from the second position, and the second lens cover, by way of the coupling, automatically and simultaneously moves into the first position.

The first lens cover automatically locks in place by a locking construction when the first lens cover is moved into the second position from the first position, the second lens cover is held in the second position by the coupling when the first lens cover is locked in the second position.

The embodiment can further include a void space into which is the first lens cover. An external surface of the first lens cover facing a first direction is substantially coplanar with an external surface of a base of the case facing the first direction.

The embodiment can further include a first end wall of the case extending along a first end of the case. The first end wall has an external surface facing a direction which is a same direction as the first lens cover moves during movement of the first lens cover from the second position to the first position. A gap exists between a first portion and a second portion of the first end wall external surface. A first end wall integration portion of said second lens cover has an external surface. When the second lens cover is in the first position, the integration portion sits in the gap and the external surface of the integration portion is substantially coplanar with the first end wall external surface and faces the same direction as the first end wall external surface.

BRIEF DESCRIPTION OF THE DRAWINGS

FIG. 2A shows the perspective view of the case shown in FIG. 1A with the first lens cover and second lens cover in a lens uncovering second position; the indicator has shifted to a protruding position.

FIG. 2B shows the perspective view of the case shown in FIG. 1B except the first and second lens covers are in the lens uncovering second position; the indicator has shifted to a protruding position.

FIG. 3A shows a perspective view of a first base portion of the base of the mobile device case looking into an internal surface of the first base portion; the first lens cover and second lens cover are in the first position; the view shows internal components of the case including the first lens cover, the second lens cover, a coupling between the first and second lens cover, a biasing member biasing the first lens cover into the first position, the bolt coupled to a biasing member in a first lens cover recess, and the indicator in an un-protruding orientation.

FIG. 3B shows the perspective view shown in FIG. 3A of the first base portion of the base of the mobile device case looking into an internal surface of the first base portion; the first lens cover and second lens cover are in the second position; the view shows internal components and recesses of the case including the first lens cover, the second lens cover, a coupling between the first and second lens cover, the bolt locking the first lens cover into the second position and disposed in a receiver, and the indicator in a protruding orientation.

FIG. 5A is a perspective view of a second base portion of the base looking into its external surface;
sidewalls and end walls of the case extend form the second base member.

FIG. 5B is a view of the second base portion shown in FIG. 5A looking down into the external surface.

FIG. 5C is an opposite sided view of the FIG. 5B looking down into an internal surface of the second base portion.

FIG. 5D is a first end wall view of the case shown in FIG. 5A.

FIG. 6A is a view looking down into the internal surface of the first lens cover.

FIG. 6B is an opposite sided view of the view shown in FIG. 6A looking down into the external surface of the first lens cover.

FIG. 6C is a perspective view of the lens cover of FIG. 6a looking into its external surface.

FIG. 7A is a perspective view of the second lens cover looking into the lens covering portion.

FIG. 7B is a view of the second lens cover looking directly into the lens covering portion.

FIG. 7C is a view of the second lens cover looking down into the first end wall integration portion of the second lens cover.

FIGS. 10A-10C show an alternative embodiment of the phone case; the embodiment has a first half uncoupled from a second half; the first half; the first half includes the first lens cover and the second lens cover.

Figures 1A, 1B:
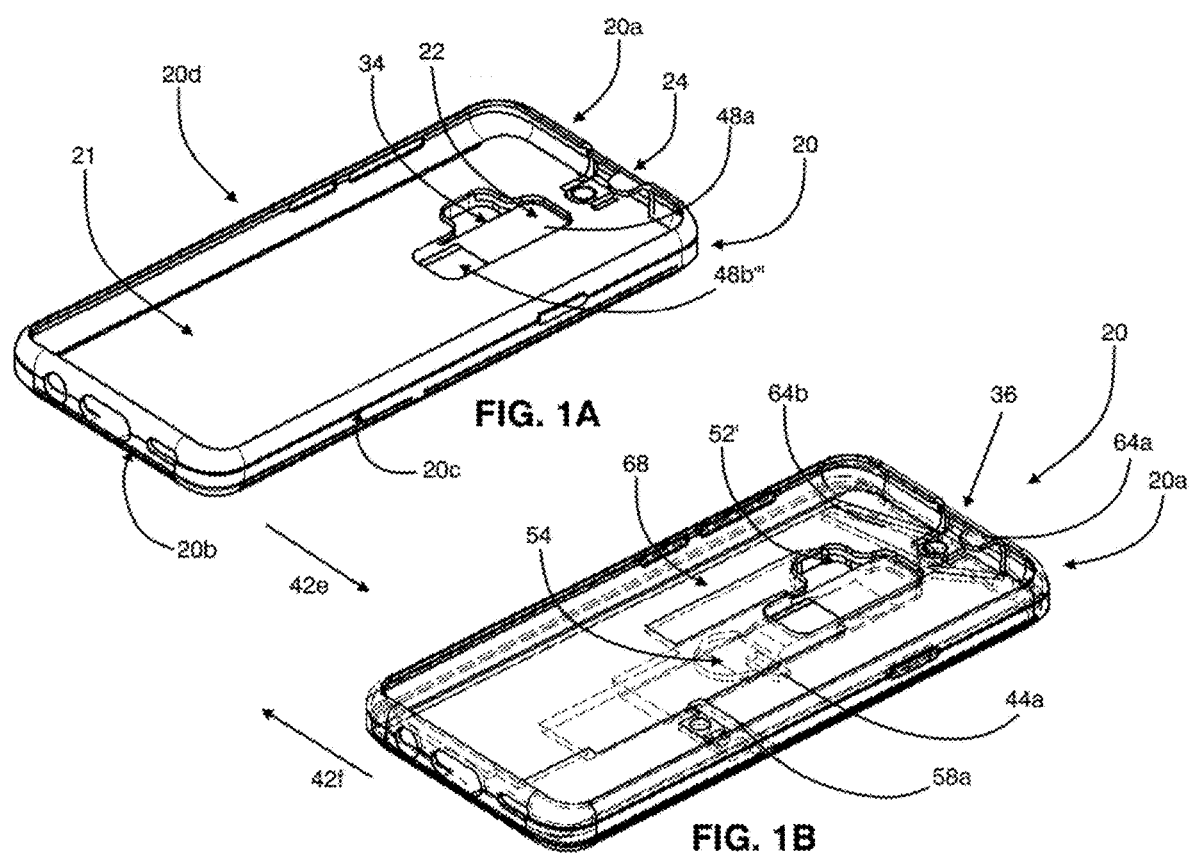
FIG. 1A shows a perspective view of the mobile device case of the present invention having the first lens cover and second lens cover in a lens covering first position.
FIG. 1B is the same perspective view of the case shown in FIG. 1A except it shows a stripped-down view of certain internal components of the case in dashed lines including portions of the first lens cover, portions of second lens cover, a bolt, an indicator in an un-protruding position, a coupling receiving recess and, a bolt receiving recess.

Before any embodiments of the invention are explained in detail, it is to be understood that the invention is not limited in its application to the details of construction and arrangement of components set forth in the present disclosure. The invention is capable of other embodiments and of being practiced or of being carried out in various ways. Also, it is to be understood that the phraseology and terminology used herein is for description and should not be regarded as limiting. The use of "including," "comprising" or "having" and variations thereof herein is meant to encompass the items listed thereafter and equivalents thereof as well as additional items. The term delimit(s) as applied to a structure bounding a space does not means the structure is the only structure that bounds the space. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Now referring to FIG. 1A-2B a mobile device case 20 includes a first lens cover 22 and a second lens cover 24. With a device 26 in the case, the case has a device carrying orientation. Without the device 26 in the case, the case has an empty orientation. A biasing force 28 urges the first lens cover to reside in a lens covering first position. A flexible resilient member 30 coupled to the first lens cover 22 and a portion of the base provides the biasing force. The device 26, see FIGS. 8A-9B for reference to device and its features, can be a smart phone such as a Galaxy S9 Plus. A coupling 32 between the first 22 and second 24 lens cover ensures that the second lens cover 24 resides in a lens covering first position 36 when the first lens cover resides in the first position 34. The coupling 32 also ensures that when the first lens cover resides in a lens uncovering second position 38, the second lens cover resides in a lens uncovering second position 40. The movement of the first lens cover can be said to be dominant and the movement of the second lens cover can be said to be subservient. The first lens cover 22 in the first position 34, with the case in a device carrying orientation, covers a first camera lens 26a. The lens faces a first direction 42a. The second lens cover 24 in the first position 36 covers a second camera lens 26b of the device. The second lens 26b faces a second direction 42b opposite the first direction 42a. The first lens cover 22 and second lens cover 24 are each moveable from their respective first positions 34, 36 into their respective uncovered lens second position 38, 40. The coupling 32 between the first lens cover 22 and the second lens cover 24, ensures that moving the first lens cover 22 from the first position 34 into the second position 38 simultaneously and automatically moves the second lens cover 24 from the first position 36 into the second position 40. Each lens cover, when moved into their respective lens uncovering second position from the first position, with the case in a device carrying orientation, uncovers their respective lens so the lens is unobstructed by its respective lens cover. The coupling 32 also ensures that when the first lens cover 22 moves from the second position 38 to the first position 34 by the biasing force 28 acting on the first lens cover 22, the second lens cover 24 simultaneously and automatically moves to the first position 36 from the second position 40 with the first lens cover. The coupling 32 is described in more detail below.

Figures 4B, 4C:
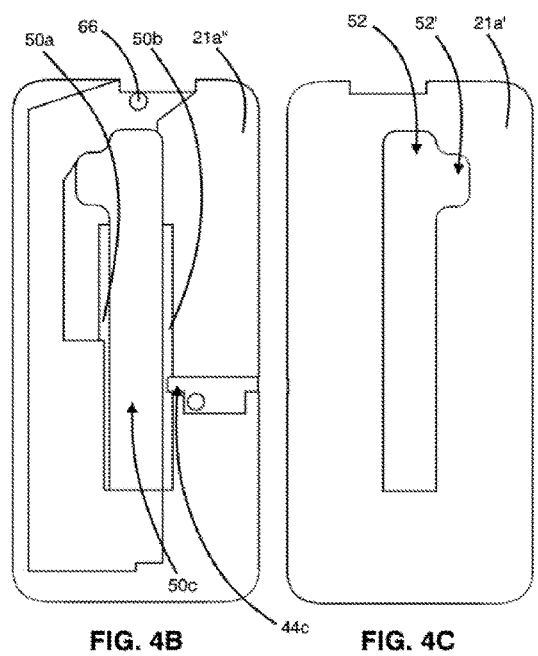
FIG. 4B is a view of the first base portion shown in FIG. 4A looking down into the internal surface.
FIG. 4C is an opposite sided view of the view shown in FIG. 4B looking down into an external surface of the first base portion.
Figure 4A:
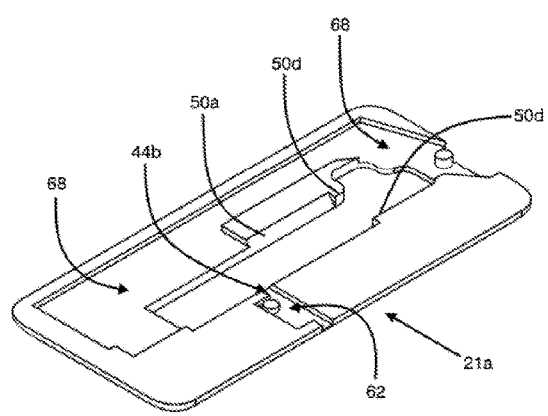
FIG. 4A is a perspective view of the first base portion of FIG. 3a looking into the internal surface with all the components shown in FIG. 3A removed.
Figure 8A:
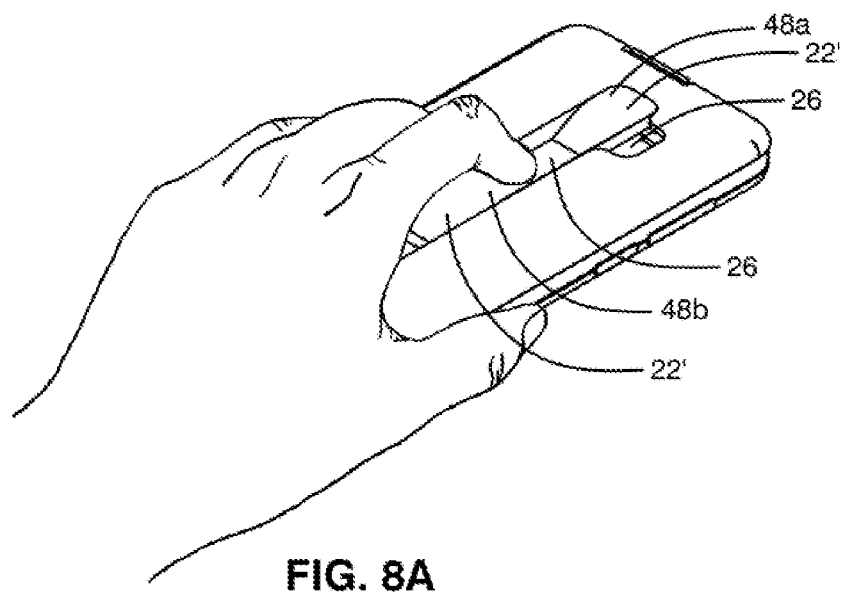
FIG. 8A is a perspective view of the mobile device case having the device therein; the view faces the external surface of the case and the rear of the device; the first lens covering portion and first lens cover are in a lens covering first position
Figure 8B:
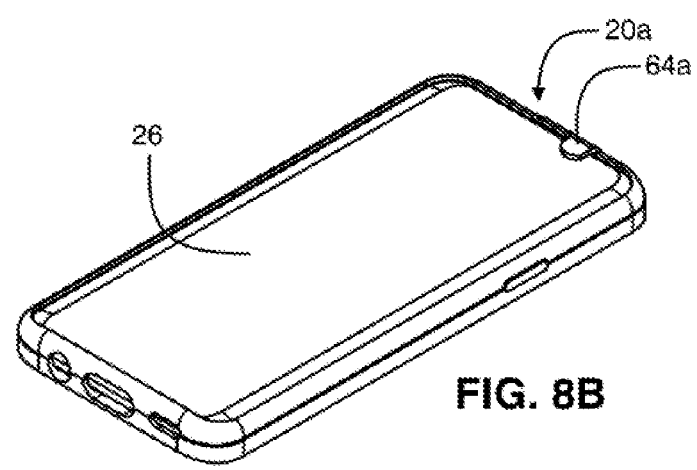
FIG. 8B is a perspective view of the mobile device case having a device therein; the view faces the screen of the device; the second lens covering portion and second lens cover are in a lens covering first position.
Figure 9A:
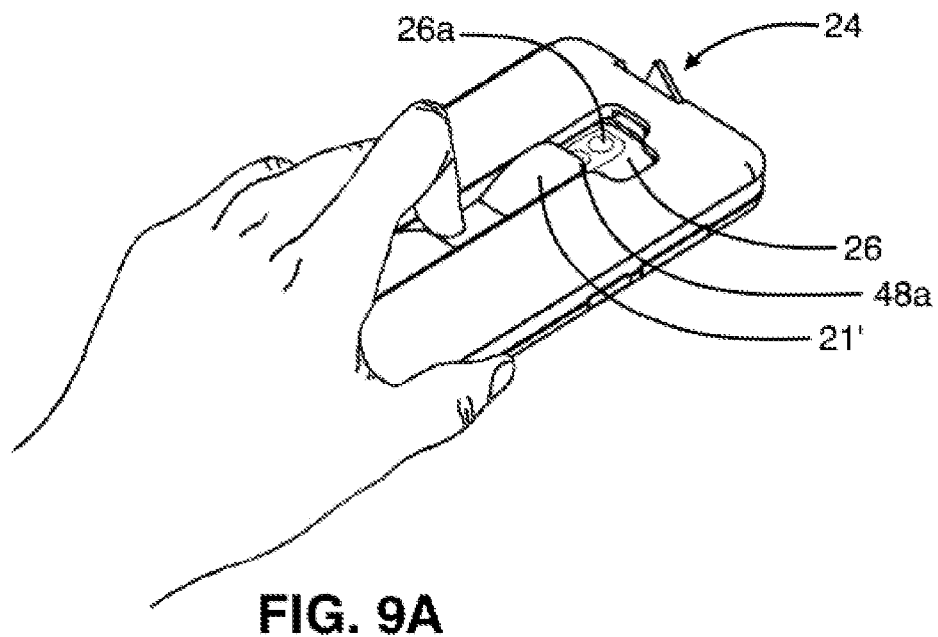
FIG. 9A is the perspective view of the case and the device shown in FIG. 8A except the first lens covering portion and the first lens cover are in a lens uncovering second position.
Figure 9B:
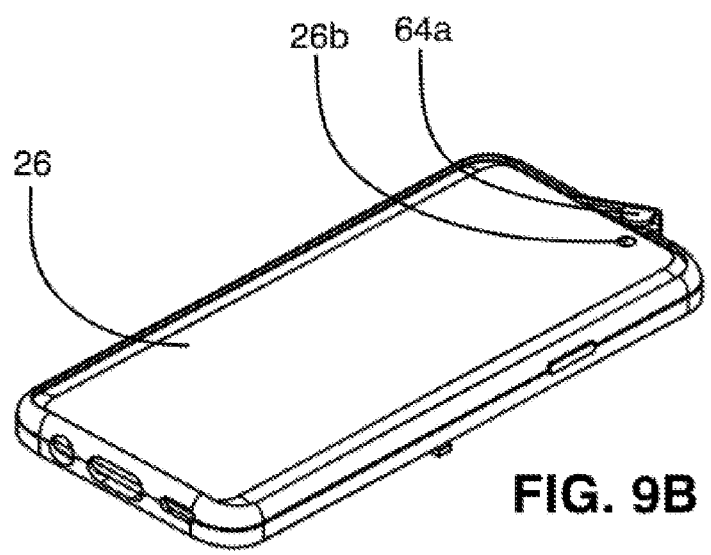
FIG. 9B is the perspective view of the case and the device shown in FIG. 8B except the second lens covering portion and second lens cover are in a lens uncovering second position.

Now further referring to FIGS. 4A-4B, the first lens cover 22 automatically locks in place by a locking construction 44a, 44b, 44c of the case 20 when the first lens cover 22 is moved into the second position 38. The second lens cover 24 is held in the second position 40 by the coupling 32 when the first lens cover 22 is locked in the second position 38. When the first lens cover 22 is locked in place in the second position 38, the first 22 and second 24 lens covers will remain in the second position 38, 40 without the aid of an operator applying a force to the lens covers, until the first lens cover is unlocked from being in the second position 38. The locking construction 44a, 44b, 44c overcomes the force biasing the first lens cover towards the first position 34. Further the locking construction prevents movement into the first position of the first lend cover by the hand of an operator wherein the force applied is twice that of the biasing force. When the first lens cover 22 is unlocked, the biasing force 28 automatically moves the first lens cover into the first position 34 from the second position 38. The second lens cover 24, by way of the coupling 32, also automatically and simultaneously moves into first position 36 from the second position 40. The details of the locking construction and its operation are set forth in more detail below.

The first lens cover 22 moves from the first position 34 to the second position 38 in a third direction 42c and from the second position to the first position in a fourth direction 42d. The movement between the first and second positions is along a first pathway. The first pathway 46 extends along a straight line in a direction parallel to an axis of the case. The axis is the major axis of the case. The first lens cover 22 includes a portion 48a that physically overlaps with the first camera lens 26a when the lens cover 22 resides in the first position 34, a portion 48b that interfaces with the digit of a hand, and a portion 48c that interfaces with a guide 50a, 50b, 50c, 50d.

Now further referring to FIGS. 5A-9B, the digit interface portion 48b includes a portion that extends from the lens cover portion 48a that physically overlaps the lens. The digit interface portion 48b comprises surfaces 48b', 48b'' that extend in a direction away from an external surface 22' of the first lens cover. The external surface faces 22' the first direction 42a. The digit surfaces 48b', 48b'' extend in the second direction 42b at an angle between 15 and 90 degrees, preferably about 25 degrees, relative to the lens cover external surface 22'. The digit surfaces 48b', 48b'' delimit a void space 48b'''. An operator moves the first lens cover 22 from the first position 34 to the second position 36 by placing a digit into the void space 48b''' and pushing the first lens cover 22 in the third direction 42c along the pathway 46.

The portion of the lens cover 48c that interfaces with the guide 50a, 50b, 50c, 50d has a surface 22'' that interfaces with a surface 50a, 50b of the guide and rides along the guide surface 50a, 50b. In the present case, the first lens cover interface surface 22'' slides along the guide surface 50a, 50b. The interface surface 22'' has an angle of between 20 and 90 degrees and preferably 45 degrees, relative to the lens cover external surface 22'. The lens cover interface surface 22'' is on opposite sides of the first lens cover 22. An end of the coupling 32 is connected to the interface portion 48c of the first lens cover. The guide surface 50a, 50b has the same angle as the interface surface and delimits opposite sides of a void space 50c into which is the interface portion 48c of the lens cover 22. The guide has abutments 50d at one end which stop the movement of the lens cover in the fourth direction by contacting abutments 22''' of the lens cover. The guide is formed on and from portions of the base 21.

The portion of the first lens cover 48a that overlaps the camera lens 26a is into a void space 52 delimited by surfaces of the base 21 of the case 20 including the first base portion 21a. External surfaces 22' of the first lens cover facing the first direction are substantially coplanar with each other and with an external surface 21a' of a base 21 of the case 20; including the first base portion 21a. The base external surface 21a' faces the first direction 42a. The void space of the guide 50c, and the void space 52 into which is the lens covering portion 48a, are continuous. Also continuous with the lens covering portion receiving void space 52 is a through space 52' delimited by the base 21 which provides a through opening to a light and a sensor of the device. The light and sensor face the first direction 42a.

The locking construction of the case includes a bolt 44a biased to move in a fifth direction 42e. When the first lens cover is in the second position 38, the bolt 44a aligns with a void space 44c of a receiver 44b. The aligned bolt 44a, under the biasing force, extends into the void space 44c of the receiver 44b.

When the bolt 44a is in the receiver 44b, the first lens cover 22 is locked in place. The bolt before it extends into the receiver is more in a void space 54 delimited by the first lens cover 22 than when not in the receiver 44a. When in the receiver, a portion of the bolt can remain in the void space of the lens cover. The bolt is coupled to the lens cover by a resilient flexible member 56, a spring, which provides the biasing force to push the bolt 44a into the receiver void space 44c when the bolt aligns with the receiver void space 44c. The spring 56 itself is into the void space 54 delimited by the lens cover which in the present example is the void space which includes the bolt. The locking construction 44a, 44b, 44c can be opposing surfaces on the first lens cover and a portion of the base, including the first base portion 21a, which provide a friction fit. The friction fit holds the first lens cover in the second position overcoming the biasing force. The friction fit can be overcome by the hand of an operator moving the first lens cover in the fourth direction 42d to break the friction fit. The locking construction can be a snap construction. A surface on the first lens cover and a portion of the base, including the first base portion, provide the snap construction. One of the surfaces snap over or on the other of the surfaces to lock the cover in place. The snap holds the first lens cover in the second position overcoming the biasing force. The snap fit can be overcome by the hand of an operator moving the first lens cover in the fourth direction to break the snap fit.

The case includes an indicator 58a, 58b, the perception of which changes, when the first lens cover 22 orients to the second position 38 from the first position 34. The perception also changes when the first lens cover 22 orients to the first position 34 from the second position 38. The change in how the indicator is perceived can include any of the following: a change in the orientation of the indicator relative to other portions of the case, a change in appearance of the indicator, and/or a change in the feel of the indicator. In the present case the indicator includes a body 58a and an extension 58b. The extension protrudes out from the side of a portion of the case in the fifth direction 42e when the first lens cover 22 orients to the second position 38 from the first position 34. The extension 58b, when the first lens cover is in the first position 34, is not protruding from the portion of the side of the case or is less protruded from the side of the case than when the first lens cover resides in the second position 38. A resilient flexible member 60 such as an elastomeric member, biases the indicator towards a sixth 42f direction opposite the fifth direction 42e. The indicator 58a, 58b is biased to be into a void space 62 delimited by surface portions of the base 21, including the first base portion 21a, when the first lens cover 22 is in the first position 34. The bolt 44a of the locking construction, when it extends into the receiver void space 44c, pushes the indicator 58a, 58b in the fifth direction so that the extension 58b moves in the fifth direction 42e from the not protruding position or less protruding position to the position protruding out of the side of a portion of the first side of the case. A portion of the indicator 58a remains in the indicator void space 62 when the extension 58b moves to the position protruding outside of the portion of the first side of the case. The force biasing the bolt 44a pushes the indicator causing the extension 58b to orient to the position protruding. The bolt 44a when pushing on the indicator serves as an actuator.

An operator to unlock the first lens cover 22 from the second position 38, pushes on the extension 58b of the indicator to move in the sixth direction 42f into the portion of the case from which it protrudes (the indicator void space 62). Movement of the indicator in the sixth direction pushes the bolt 44a to move in the sixth direction 42f out of the receiver and more into the recess 54 of the first lens cover. The indicator 58a, 58b in the context of moving the bolt serves as an actuator. Once the bolt is out of the receiver, the biasing force 28 acting on the first lens cover 22 by the biasing member 30, pushes the lens cover 22 into the first position 34 from the second position 38. The coupling 32 between the first lens cover and the second lens cover, automatically and simultaneously with the movement of the first lens cover 22, moves the second lens 24 cover into the first position 36 from the second position 40. The biasing force acting on the indicator keeps the extension 58b from protruding out of the first side portion of the case until actuated by the bolt 44a.

Turning to the second lens cover 24, it has a lens covering portion 64a, a lever portion 64b, a base coupling portion 64c, and a first end wall integration portion 64d. The lens covering portion 64a overlaps the second camera lens 26b when the second lens cover 24 is in the first position 36 and uncovers the lens 26b when the lens cover is moved into the second position 40. The first end wall integration portion 64d integrates the second lens cover 24 into the first end wall 20a. The first end wall of the case extends along a first end of the case. The first end wall 20a has an external surface 20a' facing the fourth direction 42d. A gap 72 exists between a first end wall section and a second end wall section of end wall 20a. When the second lens cover is in the first position 36, the integration portion 64d sits in the gap and its external surface is substantially coplanar with the external surface 20a' facing the fourth direction 42d. The lever portion 64b connects to one end of the coupling 32. The base coupling portion 64c, rotatably connects the second lens cover 24 to the base 21. Preferably it connects to a pivot 66 formed on and with a portion of the base 21. The lever 64b, coupling portion 64c, and pivot 66 are into void spaces 68 delimited by portions of the base 21; including the first base portion 21a. The void spaces 68 are continuous with each other. The second lens cover 24 when moved from the first position 36 to the second position 40 moves along a second pathway 70. The second pathway is defined by a series of direction vectors which differ from the first pathway. The second pathway is arcuate and about the pivot 66.

In more detail the base 21 has a first base portion 21a and a second base portion 21b. The first base portion 21a has an exterior surface 21a' facing the first direction 42a, the first base portion 21a has an internal surface 21a" facing the second direction 42b. Portions of the first base portion internal surface 21a' form at least portions of the guide 50a, 50b, 50c, 50d and delimit the guide void space 50c into which is the first lens cover guide interface surface 48c and the digit interface 48b. The internal first base portion surface 21a" also forms the receiver 44b and delimits the receiver void space 44c. The internal surface 21a" also delimits the indicator receiving void space 62. The receiver receiving void space 44c and indicator receiving void space 62 are continuous. The first base portion internal surface 21a" also delimits the void spaces 68 into which is the coupling 32, the lever 64b, the pivot 66, and the first lens cover biasing member 30. These void spaces 68 are continuous with each other. The first lens cover 22 is seated on the first base portion 21a and more particularly on an internal surface 21a" of the first base portion forming the guide surface 50b. The second lens cover 22 is coupled to the first base portion 21a by the pivot post 66.

The second base portion 21b has an internal surface 21b" facing the first base portion internal surface 21a". The internal surfaces 21a", 21b" of the first base portion 21a and the second base portion 21b are affixed to each other. The second base portion internal surface 21b" covers the receiver 44b and its void space 44c, the indicator void space 62 and the indicator 58a, 58b when the first lens cover 22 is in first position 34, a portion of the indicator 58a when the first lens cover 22 is in the second position 38; It further covers the void space 68 for the coupling and the coupling 32, the void space for the bias member 68 and the bias member 30, the void space for the lever 68 and the lever 64b. It further covers the first lens cover void space 54 and the bolt 44a and spring located therein 56, the digit interface void space 48b''' when the first lens cover 22 resides in the second position 38, and an internal facing surface 23 of the first lens cover. Although the aforementioned items and void spaces are completely covered, they could only be partially covered. The partial covering need only cover enough to stabilize the items while permitting the movement and the function of the items as described above. For instance, the second base portion 21b could have an expanded construction which provides a series of through holes through the second base portion. A through hole construction would save on material cost and shipping. An external surface of the case faces the external environment and delimits a portion of the case from the environment and delimits an exterior of the case. An internal surface of the case faces an interior portion of the case and delimits an interior of the case.

The case has a first sidewall 20c at a first side of the case. The first side wall has an external surface 20c' facing a fifth direction. The case has a second sidewall 20d on a second side of the case. The second side wall has an external surface 20d' facing the sixth direction. The case has a first end wall 20a at a first end of the case. The first end wall has an external surface 20a' facing the fourth direction. The case has a second end wall 20b at a second end of the case. The second end wall has an exterior surface 20b' facing the third direction. The side walls and end walls extend in the second direction 42b away from the base 21. Each sidewall is coupled to each end wall, and all the walls are coupled to the base at the second base portion external surface 21b'.

Now referring more particularly to FIGS. 10A-10C, in an alternative embodiment the case 20f is divided into a first half 20z (upper half) and a second half 20x (lower half). The first lens cover 22z and the second lens cover 24z are adapted to be part of the first half. The springs are also adapted to be formed as part of the first half. The first and second lens cover are biased in the lens covering position and independently moveable between the lens covering position and the position where they do not cover the lenses.

As is evident from the foregoing description, certain aspects of the present invention are not limited to the details of the examples illustrated herein. It is therefore contemplated that other modifications and applications using other similar or related features or techniques will occur to those skilled in the art. It is accordingly intended that all such modifications, variations, and other uses and applications which do not depart from the spirit and scope of the present invention are deemed to be covered by the present invention. Other aspects, objects, and advantages of the present invention can be obtained from a study of the drawings, the disclosures, abstract and the appended claims.

The invention claimed is:

1. A mobile device case comprising:
a first lens cover, said first lens cover moveable between a first position and a second position;
a second lens cover, said second lens cover moveable between a first position and a second position;
a coupling connecting the first lens cover to the second lens cover; wherein
when said first lens cover is in the first position and the second lens cover is in the first position, movement of said first lens cover from said first position to the second position, simultaneously and automatically moves the second lens cover from said first position to the second position;
when the first lens cover is in the second position and unlocked, and the second lens cover is in the second position, a biasing force automatically moves the first lens cover into the first position from the second position, and the second lens cover, by way of the coupling, automatically and simultaneously moves into the first position.

2. The mobile device case of claim 1 wherein:
the first lens cover automatically locks in place by a locking construction when the first lens cover is moved into the second position from the first position, the second lens cover is held in the second position by the coupling when the first lens cover is locked in the second position.

3. The mobile device case of claim 2 wherein the first lens cover comprises:
a lens covering portion, a portion adapted to interface with the digit of a hand, and a portion adapted to interface with a guide.

4. The mobile device case of claim 3, wherein the portion adapted to interface with the digit of a hand comprises:
a surface that extends in a direction away from an external surface of the lens cover, said external surface of said first lens cover faces a first direction.

5. The mobile device case of claim 4, wherein:
the surface that extends away from the external surface of the lens cover, extends in a second direction opposite the first direction at an angle of between 10 and 90 degrees relative to said external surface of said first lens cover.

6. The mobile device of claim 5 wherein:
the surface that extends at an angle delimits a void space.

7. The mobile device of claim 6 wherein:
the surface that extends at an angle has a first portion and a second portion, said first and second portion delimit opposite ends of the void space.

8. The mobile device of claim 3, wherein:
the portion that interfaces with the guide has a surface that interfaces with a surface of the guide and rides along the surface of the guide when the first lens cover moves between the first and second position.

9. The mobile device case of claim 8, wherein:
the surface of the guide delimits opposite sides of a void space into which is the portion that interfaces with the guide, the external surface of the first lens cover facing the first direction is substantially coplanar with an external surface of a base of the case facing the first direction.

10. A mobile device case comprising:
a first lens cover, said first lens cover moveable between a first position and a second position;
a second lens cover, said second lens cover moveable between a first position and a second position;
a coupling connecting the first lens cover to the second lens cover; wherein
when said first lens cover is in the first position and the second lens cover is in the first position, movement of said first lens cover from said first position to the second position, simultaneously and automatically moves the second lens cover from said first position to the second position;
when the first lens cover is in the second position and unlocked, and the second lens cover is in the second position, a biasing force automatically moves the first lens cover into the first position from the second position, and the second lens cover, by way of the coupling, automatically and simultaneously moves into the first position;
the first lens cover automatically locks in place by a locking construction when the first lens cover is moved into the second position from the first position, the second lens cover is held in the second position by the coupling when the first lens cover is locked in the second position;
said locking construction having:
a bolt biased to move in a locking direction by a resilient flexible member, said bolt coupled to said first lens cover by said resilient flexible member;
a receiver delimiting a receiver void space, and wherein:
when the first lens cover is in the second position, the bolt aligns with the void space of a receiver, the aligned bolt, under the biasing force, moves in the locking direction to extend into the void space of the receiver and locks the first lens cover in place in the second position.

11. The mobile device case of claim 10, further comprising:
an indicator, the perception of which changes, when the first lens cover orients to the second position from the first position, the perception also changes when the first lens cover orients to the first position from the second position.

12. The mobile device case of claim 11, wherein the indicator comprises:
an extension which protrudes out from a portion the case in a direction of protrusion when the first lens cover orients from the first position to the second position, the extension, when the first lens cover is in the first position, is not protruding from the portion of the case or is less protruded from the portion of the case than when the first lens resides in the second position.

13. The mobile device case of claim 12, further comprising:
   a resilient flexible member which biases the indicator towards a direction opposite the direction of protrusion.

14. The mobile device case of claim 13 wherein:
   the force biasing the bolt in the locking direction, as the bolt extends into the receiver void space, pushes the indicator in the direction of protrusion so that the extension moves in the direction of protrusion from the not protruding position or less protruding position to the position protruding out of the portion of the case.

15. The mobile device case of claim 14, wherein:
   pushing on the extension of the indicator to move in the direction opposite the direction of protrusion, pushes the bolt to move in a direction opposite the locking direction and out of the receiver; then the biasing force acting on the first lens cover, pushes the lens cover into the first position from the second position; the coupling between the first lens cover and the second lens cover, automatically and simultaneously, with the movement of the first lens cover, moves the second lens cover into the first position.

16. A mobile device case comprising:
   a first lens cover, said first lens cover moveable between a first position and a second position;
   a second lens cover, said second lens cover moveable between a first position and a second position;
   a coupling connecting the first lens cover to the second lens cover; wherein
   when said first lens cover is in the first position and the second lens cover is in the first position, movement of said first lens cover from said first position to the second position, simultaneously and automatically moves the second lens cover from said first position to the second position;
   when the first lens cover is in the second position and unlocked, and the second lens cover is in the second position, a biasing force automatically moves the first lens cover into the first position from the second position, and the second lens cover, by way of the coupling, automatically and simultaneously moves into the first position;
   a first end wall extending along a first end of the case, the first end wall has an external surface facing a direction which is a same direction as the first lens cover moves during movement of the first lens cover from the second position to the first position; a gap exists between a first portion and a second portion of the first end wall external surface;
   a first end wall integration portion forming part of said second lens cover, wherein when the second lens cover is in the first position, the integration portion sits in the gap and an external surface of the integration portion is substantially coplanar with the first end wall external surface and faces the same direction as the first end wall external surface.

17. The mobile device case of claim 16, wherein:
   the first lens cover moves between the first and second positions along a first pathway, the first pathway extends along a straight line in a direction parallel to an axis of the case;
   the second lens cover moves between the first position and the second position along a second pathway, the second pathway is defined by a series of direction vectors which differ from direction vectors of the first pathway.

18. The mobile device case of claim 17, wherein: the second pathway is arcuate and about the pivot.

* * * * *